United States Patent [19]

Tanaka et al.

[11] 4,436,563

[45] Mar. 13, 1984

[54] FLUX FOR OVERLAY WELDING

[75] Inventors: Osamu Tanaka, Fujisawa; Kazuhiro Takeba, Yamato; Hiroshi Saita, Fujisawa; Yukinobu Matsushita, Yokohama; Koji Koyabu, Kamakura, all of Japan

[73] Assignee: Kabushiki Kaisha Kobe Seiko Sho, Kobe, Japan

[21] Appl. No.: 400,586

[22] Filed: Jul. 21, 1982

[30] Foreign Application Priority Data

Jul. 27, 1981 [JP] Japan .................................. 56-118241

[51] Int. Cl.³ ............................................. B23K 35/34
[52] U.S. Cl. ............................................ 148/26; 75/53
[58] Field of Search .............................. 148/26; 75/53

[56] References Cited

U.S. PATENT DOCUMENTS

| 3,580,748 | 5/1971 | DeLong | 148/26 |
| 3,704,744 | 12/1972 | Halley | 148/26 |
| 3,932,200 | 1/1976 | Miyano | 148/26 |
| 3,959,031 | 5/1970 | More | 148/26 |
| 4,066,478 | 1/1978 | Dettaeck | 148/26 |
| 4,207,121 | 6/1980 | Nakabayashi | 148/26 |
| 4,338,142 | 7/1982 | Okuda | 148/26 |

Primary Examiner—P. D. Rosenberg
Attorney, Agent, or Firm—Oblon, Fisher, Spivak, McClelland & Maier

[57] ABSTRACT

A flux for overlay welding, essentially containing by weight 30–70% of $CaF_2$, 10–30% of $Al_2O_3$, 1–15% of CaO, 5–25% of $SiO_2$ and 5–25% of MgO such that the total amount of $CaF_2$, $Al_2O_3$, CaO, $SiO_2$ and MgO is greater than 70%, while satisfying the conditions of $MgO/(Al_2O_3+SiO_2) \geq 0.20$, $MgO/SiO_2 \leq 2.0$ and $MgO/Al_2O_3 \leq 2.0$.

3 Claims, 5 Drawing Figures

FLUX FOR OVERLAY WELDING

BACKGROUND OF THE INVENTION

1. Field of the Invention

This invention concerns a flux for overlay welding, and more particularly to a flux for electro-slag overlay welding with strip electrode (hereinafter referred to as "ES overlay welding" for brevity) in flat position, which is capable of forming clean surfacing bead and is improved in slag detachability with reduced slag remains (hereinafter "slag remain" means that even fine slag can not be removed from the surface of the bead.)

2. Description of the Prior Art

Fluxes for the ES overlay welding are disclosed, for example, in Japanese Patent Publication No. 53-29657 and Japanese Laid-Open Patent Specification No. 55-165294, and in most cases contain $CaF_2$ and $Al_2O_3$ as major components along with oxides such as silica and iron oxide. However, sometimes the conventional fluxes of this sort have a serious problem in that a great deal of time and labor is required for peeling off and removing remained slag which sticks on the bead surfaces in a considerable degree. This tendency is conspicuous especially in the case of Type 347 which is used widely, for instance, for overlay welding on inner surfaces of petroleum refining reactors. In such a case, it takes considerable labor and time to remove the slag from the surfaces of beads which sometimes measure 2 to 4 meters in inside diameter and 20 to 30 meters in length. If the removal of slag is incomplete, there will arise the problem of slag inclusion in the next pass of the welding operation, resulting in a defective weld. Therefore, there has been a strong demand for a flux for ES overlay welding, which can form easily detachable slag.

SUMMARY OF THE INVENTION

It is therefore an object of the present invention to provide a flux composition which will satisfy the above-mentioned demand, and the instant invention has been attained as a result of an extensive study of the influences of the flux components on the thermal expansion coefficient, solidifying point, remaining properties and detachability of the produced slag.

According to the present invention, the above-mentioned object has been achieved by a flux composition which essentially contains by weight 30-70% of $CaF_2$, 10-30% of $Al_2O_3$, 1-15% of CaO, 5-25% of $SiO_2$ and 5-25% of MgO such that the total amount of $CaF_2$, $Al_2O_3$, CaO, $SiO_2$ and MgO is greater than 70%, while satisfying the conditions of $MgO/(Al_2O_3+SiO_2) \geq 0.20$, $MgO/SiO_2 \leq 2.0$ and $MgO/Al_2O_3 \leq 2.0$.

The above and other objects, features and advantages of the present invention will become apparent from the following description and appended claims, taken in conjunction with the accompanying drawings.

PARTICULAR DESCRIPTION OF THE INVENTION

Figure 1:
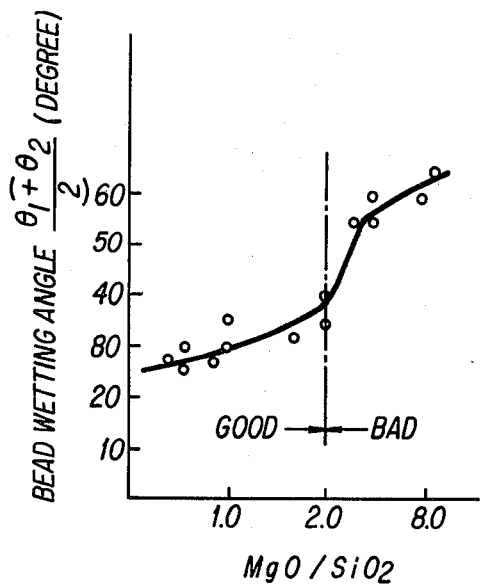
FIG. 1 is a diagram of the ratio of $MgO/SiO_2$ versus the bead wetting angle.

Turning now to the essential components of the flux composition according to the invention, the component $CaF_2$ has been regarded as a component essential to the flux for ES overlay welding with strip electrode. More particularly, the slag to be formed in ES overlay welding is required to have such an electric conductivity as would not generate an arc, to have an electric resistance for generating Joule heat which is sufficient for melting the welding electrode, and to have a fluidity which is high enough for covering the deposited metal. For imparting these properties to the flux, $CaF_2$ has been considered to be the most suitable one. On the presumption that the flux would also contain $CaF_2$ as one of its major components, experiments were conducted to study the influences as imposed on the slag detachability by the oxides which would be generally blended as a slag-forming agent. As a result, it has been revealed that the remaining of slag can be suppressed by adding a suitable amount of MgO along with $CaF_2$, improving the slag detachability to a significant degree. Namely, if the flux is added with MgO which is effective for elevating the thermal expansion coefficient and solidifying point of the slag, the slag solidification occurs at a temperature which is far higher than the room temperature, and the solidified slag undergoes large deformation in the cooling stage after solidification. Therefore, the slag easily comes off the surface of the deposited metal or in some cases shows a tendency of spontaneously falling off the deposited metal surfaces. However, if the MgO content is increased too much, it will decrease the smoothness between the base metal and bead, and increase the wetting angle of the bead. Then, slag inclusions occur frequently at the overlapping area or undercuts at the both edges of the bead depending upon the welding condition. Nevertheless, we carried on our research with a view to solving these problems by combined use of other oxides, and as a result have found that combined use of suitable amounts of $SiO_2$ and $Al_2O_3$ is effective for improving the bead smoothness and the bead appearance, respectively, provided the contents of MgO, $SiO_2$ and $Al_2O_3$ are restricted to particular ranges respectively and in relation with each other. For example, if the MgO content is small relative to the proportions of $SiO_2$ and $Al_2O_3$, there will arise the problem of slag remains. On the contrary, if the MgO content is relatively large, it becomes difficult to improve the smoothness and appearance of the bead. More specifically, it has been confirmed that the ratio of $MgO/(SiO_2+Al_2O_3)$ plays an important role in the property of slag detachability, the ratio of $MgO/SiO_2$ in the bead smoothness, and the ratio of $MgO/Al_2O_3$ in the bead appearance. In this connection, Table 1 shows the results of experiments studying the bead detachability in ES overlay welding using 14 fluxes of different compositions under the following conditions.

| [Conditions of ES Overlay Welding] | |
|---|---|
| Welding electrode | Type 347 strips of 0.4 mm(t) × 150 mm(w) |
| Welding current | 2400 A, DC · RP |
| Welding voltage | 25V |
| Welding speed | 15 cm/min |
| Base metal | Mild steel, 50 mm(t) |

Figure 3:
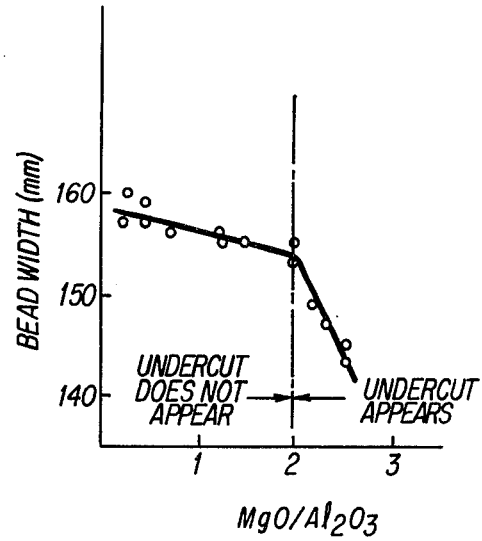
FIG. 3 is a diagram of the ratio of $MgO/Al_2O_3$ versus the bead width.
Figure 2:
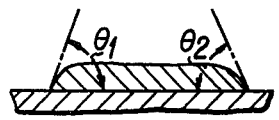
FIG. 2 is a schematic view explanatory of the method of measuring the bead wetting angle.
Figure 4A:
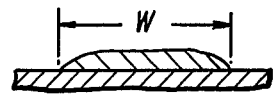
FIGS. 4(A) and 4(B) are schematic views showing the standards for the measurement of the bead width.
Figure 4B:
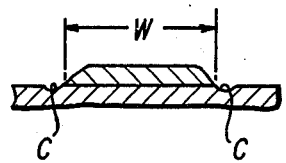

On the other hand, FIG. 1 shows the relationship between the ratio of $MgO/SiO_2$ of the flux and the wetting angle of bead [the mean value of the wetting angles $\theta_1$ and $\theta_2$ at opposite ends of a bead section shown in FIG. 2], while FIG. 3 shows the relationship of the ratio of $MgO/Al_2O_3$ of the flux and the bead width as denoted by a reference character "W" in FIGS. 4(A) and 4(B) in which the character "C" indicates an undercut portion.

TABLE 1

| Experiment No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $CaF_2$ (%) | 56 | 52 | 34 | 46 | 40 | 48 | 32 | 48 | 28 | 56 | 50 | 38 | 44 | 48 |
| CaO (%) | 14 | 13 | 9 | 11 | 10 | 12 | 8 | 12 | 7 | 14 | 12 | 9 | 11 | 12 |
| MgO (%) | 5 | 10 | 22 | 23 | 15 | 20 | 25 | 5 | 10 | 15 | 20 | 25 | 25 | 25 |
| $SiO_2$ (%) | 15 | 5 | 25 | 10 | 15 | 10 | 15 | 15 | 25 | 5 | 8 | 8 | 10 | 25 |
| $Al_2O_3$ (%) | 10 | 20 | 10 | 10 | 20 | 10 | 20 | 20 | 30 | 10 | 10 | 20 | 10 | 10 |
| $MgO/(SiO_2 + Al_2O_3)$ | 0.20 | 0.40 | 0.63 | 1.15 | 0.43 | 1.00 | 0.71 | 0.14 | 0.18 | 1.00 | 1.11 | 0.89 | 1.25 | 0.71 |
| $MgO/SiO_2$ | 0.33 | 2.00 | 0.88 | 2.30 | 1.00 | 2.00 | 1.67 | 0.33 | 0.40 | 3.00 | 2.50 | 3.13 | 2.50 | 1.00 |
| $MgO/Al_2O_3$ | 0.50 | 0.50 | 2.20 | 2.30 | 0.75 | 2.00 | 1.25 | 0.25 | 0.33 | 1.50 | 2.00 | 1.25 | 2.50 | 2.50 |
| Slag detachability* | Δ | ○ | ○ | ⊚ | ○ | ⊚ | ○ | x | x | ⊚ | ⊚ | ○ | ⊚ | ○ |
| Bead wettability (Wetting angle) | ○ (30) | ○ (40) | ○ (27) | x (50) | ○ (30) | ○ (35) | ○ (32) | ○ (25) | ○ (27) | x (60) | x (55) | x (65) | x (60) | ○ (35) |
| Bead width (mm) | 157 | 159 | 149 | 147 | 156 | 155 | 155 | 160 | 156 | 155 | 153 | 156 | 145 | 143 |
| Undercut | Nil | Nil | Present | Present | Nil | Nil | Nil | Nil | Nil | Nil | Nil | Nil | Present | Present |

⊚ : Fell off spontaneously without defects of slag inclusion.
○ : Did not fall off spontaneously but free of slag remains and defects.
Δ: Slightly slag remained at bead ends but easily came off and free of defects.
x: Considerably slag remained and defective.

Derived from the data of Table 1 and FIGS. 1 and 3 are the following conclusions.

(1) When the ratio of $MgO/(SiO_2+Al_2O_3)$ is smaller than 0.20, the slag detachability is deteriorated markedly, failing to attain the object of the invention. This is considered to be attributable to the deficiency in the relative amount of MgO which has the effects of enhancing the thermal expansion coefficient and solidifying point of the slag. However, if the ratio is greater than 0.20, the slag exhibits excellent detachability and is free of the above-mentioned problems resulting from scorching.

(2) The ratio of $MgO/SiO_2$ has to be 2.0 or lower in order to maintain good smoothness of the deposited metal with the base material, and a higher ratio will cause an abrupt increase in the wetting angle of the bead. This tendency can be observed distinctively in the graph of FIG. 1 where the wetting angle takes a sharp curve at the $MgO/SiO_2$ ratio of about 2.0.

(3) The ratio of $MgO/Al_2O_3$ has to be held below 2.0 in order to secure good bead appearance. If that ratio exceeds 2.0, undercut appears at the both edges of the bead, narrowing the bead width and impairing its appearance. This tendency is clearly seen in the graph of FIG. 3.

Although the ratios of $MgO/(SiO_2+Al_2O_3)$, $MgO/SiO_2$ and $MgO/Al_2O_3$ are determined according to the foregoing experimental data, they are effective only when the contents of the respective essential components of the flux satisfy the following conditions.

[$CaF_2$: 30–70%]

$CaF_2$ is indispensable as a major component for imparting a suitable electric conductivity to the slag and for ensuring the ES overlay welding operation to proceed smoothly without generating an arc. A flux with a $CaF_2$ content less than 30% is insufficient in these effects and thus inappropriate for the ES overlay welding. On the contrary, if it exceeds 70%, a large amount of fluoride gases is likely to be generated during the welding operation, and the Joule heat becomes insufficient due to an unduly increased electric conductivity of the slag, inviting a drop in the welding efficiency and deterioration in the bead appearance.

[CaO: 1–15%]

This has effects of enhancing the covering property of the molten slag and smoothening the bead surface, but these effects are not produced in any practical degree when its content is less than 1%. If excessive, there will occur irregular fusing of the flux and the normal welding operation cannot be maintained. Therefore, CaO content should be limited to 15% at most.

[$Al_2O_3$: 10–30%]

As mentioned hereinbefore, $Al_2O_3$ has effects of preventing degradations in the bead appearance which results from the inclusion of MgO, and increasing the generation of Joule heat by lowering the electric conductivity of the molten slag. For these purposes, it should be contained more than 10%. However, the $Al_2O_3$ content should be limited to 30% since otherwise the electric conductivity of the molten slag would be lowered too much, inviting arc generations and marked degradations in the slag detachability.

[MgO: 5–25%]

This is the most characteristic component of the flux according to the present invention in that it serves to raise the thermal expansion coefficient and solidifying point of the slag in addition to the improvement of the slag detachability as mentioned hereinbefore. In order to produce these effects sufficiently, it should be contained more than 5%. However, the upper limit should be placed at 25% as it would become difficult to improve the smoothness and appearance of the bead even if suitable amounts of $SiO_2$ and $Al_2O_3$ were added.

[$SiO_2$: 5–25%]

$SiO_2$ is essential for increasing the viscosity of the slag and improving the smoothness of the bead. It is also an important component particularly in the present invention to offset the drawbacks of MgO. These effects are produced effectively when the $SiO_2$ content is greater than 5%. An upper limit is placed at 25% since an excessive $SiO_2$ content will lose the effects of MgO, deteriorating the slag detachability to a considerable degree.

The flux of the present invention which essentially contains the foregoing components may additionally include FeO, $Na_2O$, $AlF_3$ or other oxides or fluorides and powder of a metal or alloy such as M-Cr or the like if necessary. A total amount of the additional components in excess of 30% causes degradations in the flux properties as intended by the present invention, particularly in the slag detachability, so that it is important that the total amount of the essential components of $CaF_2$, $Al_2O_3$, CaO, $SiO_2$ and MgO be greater than 70%. The flux of the present invention can produce the same effects no matter whether it is used as a bonded type, a sintered type or a fused type.

As clear from the foregoing description, the present invention has succeeded in complying to all of the requirements, i.e., improvements of the smoothness and appearance of the bead and slag detachability, and prevention of slag inclusions by defining the kinds and ratios of the respective components of the flux and employing MgO as one of essential components of the flux in an amount falling in a particular range in terms of the ratios of $MgO/(SiO_2+Al_2O_3)$, $MgO/SiO_2$ and $MgO/Al_2O_3$. The flux of the present invention can be advantageously applied particularly to Type 347 which normally suffers from considerable slag remains. However, the excellent effects of the flux of the invention can also be obtained in the case of welding electrodes of stainless steel or other material, including Type 309, 308, 316 and the like.

The invention is illustrated more particularly by the following examples.

EXAMPLES

ES overlay welding fluxes of the compositions of Table 2 were prepared and the respective fluxes were tested by the ES welding under the following conditions, checking the arc generation, smoothness and appearance of the bead, and the slag detachability. The results are also shown in Table 2.

| [Welding Conditions] | |
| --- | --- |
| Electrode | Type 347, 0.4 mm(t) × 150 mm(w) |
| Base metal | Mild steel, 50 mm(t) |
| Welding current | 2400 A, DC · RP |
| Welding voltage | 25V |
| Welding speed | 15 cm/min |

In Table 2, the letters "M" and "B" denote a fused flux and a bonded flux, respectively, and the symbols "◎", "O" and "x" indicate excellent, good and bad results, respectively.

TABLE 2

| Example No. | 15 | 16 | 17 | 18 | 19 | 20 | 21 | 22 | 23 | 24 | 25 | 26 | 27 | 28 | 29 | 30 | 31 |
| --- | --- | --- | --- | --- | --- | --- | --- | --- | --- | --- | --- | --- | --- | --- | --- | --- | --- | --- |
| Type of flux | M | M | M | B | M | M | M | M | M | M | M | M | M | M | M | M | M |
| MgO | — | 10 | 10 | 10 | 10 | 15 | 25 | 4 | 27 | 5 | 10 | 10 | 15 | 5 | 20 | 15 | 10 |
| $SiO_2$ | 7 | 15 | 15 | 15 | 25 | 5 | 25 | 5 | 18 | 3 | 30 | 20 | 10 | 8 | 20 | 15 | 10 |
| $Al_2O_3$ | 25 | 20 | 20 | 20 | 30 | 10 | 10 | 10 | 20 | 20 | 15 | 5 | 35 | 10 | 25 | 25 | 20 |
| $CaF_2$ | 63 | 45 | 35 | 40 | 30 | 60 | 35 | 58 | 30 | 60 | 50 | 65 | 35 | 75 | 25 | 45 | 40 |
| CaO | — | 10 | 10 | 3 | 5 | 10 | 5 | 13 | 5 | 12 | 5 | 10 | 5 | 2 | 10 | — | 20 |
| FeO | 5 | — | — | — | — | — | — | — | — | — | — | — | — | — | — | — | — |
| $AlF_3$ | — | — | 10 | 6 | — | — | — | 10 | — | — | — | — | — | — | — | — | — |
| $Na_2O$ | — | — | — | 2 | — | — | — | — | — | — | — | — | — | — | — | — | — |
| M—Cr | — | — | — | 4 | — | — | — | — | — | — | — | — | — | — | — | — | — |
| $MgO/(SiO_2+Al_2O_3)$ | 0 | 0.29 | 0.29 | 0.29 | 0.18 | 1.00 | 0.71 | 0.27 | 0.71 | 0.22 | 0.22 | 0.40 | 0.33 | 0.28 | 0.44 | 0.38 | 0.33 |
| $MgO/SiO_2$ | 0 | 0.67 | 0.67 | 0.67 | 0.40 | 3.00 | 1.00 | 0.80 | 1.50 | 1.67 | 0.33 | 0.50 | 1.50 | 0.63 | 1.00 | 1.00 | 1.00 |
| $MgO/Al_2O_3$ | 0 | 0.50 | 0.50 | 0.50 | 0.33 | 1.50 | 2.50 | 0.40 | 1.35 | 0.25 | 0.67 | 2.00 | 0.43 | 0.50 | 0.80 | 0.60 | 0.50 |
| Slag detachability | x | O | ◎ | ◎ | x | ◎ | O | x | ◎ | O | x | O | x | O | ◎ | ◎ | ◎ |
| Bead smoothness | O | O | O | O | O | x | O | O | x | x | O | O | O | O | O | O | O |
| Bead appearance | O | O | O | O | O | O | x | O | x | O | O | x | O | O | O | O | O |
| Arc generation | O | O | O | O | O | O | O | O | O | O | O | O | x | O | x | O | O |
| Others | | | | | | | | | | | | | Fluoride gases generated in large amounts | | Coarse bead surface, defective | | Flux fused irregularly & bead meandered |
| Overall rating | x | O | ◎ | ◎ | x | x | x | x | x | x | x | x | x | x | x | x | x |

Following are the observations based on the data of Table 2.

(1) Example No. 15 which represented the conventional flux without the MgO content exhibited considerable slag scorching.

(2) Example Nos. 16 to 18 which satisfied all of the conditions of the present invention generated no arc and showed excellent properties of bead smoothness and appearance and slag detachability.

(3) Example Nos. 19 to 27 which did not fulfil either one of the conditions of the present invention were tested for the purpose of comparison but they turned out to be defective in at least one of the required properties as indicated below.

Example 19: Unsatisfactory in bead detachability due to a too small $MgO/(SiO_2+Al_2O_3)$ ratio with insufficient effect of MgO added.

Example 20: Unsatisfactory in bead smoothness due to a too large $MgO/SiO_2$ ratio.

Example 21: Unsatisfactory in bead appearance with susceptability to undercut due to a too large $MgO/Al_2O_3$ ratio.

Example 22: Not improved in slag detachability due to deficiency in the absolute amount of MgO in spite of the appropriate $MgO/(SiO_2+Al_2O_3)$ ratio.

Example 23: Unsatisfactory in bead smoothness and appearance due to deficiency in the absolute amount of MgO although $MgO/SiO_2$ and $MgO/Al_2O_3$ are appropriate.

Example 24: Unsatisfactory in bead smoothness due to deficiency in the absolute amount of $SiO_2$ in spite of the appropriate $MgO/SiO_2$ ratio.

Example 25: Not improved in slag detachability due to deficiency in the absolute amount of $Al_2O_3$.

Example 26: Bead formed unsatisfactorily by reduction in the Joule heat generation due to deficiency in the absolute amount of $Al_2O_3$.

Example 27: Slag unduly low in electric conductivity due to deficiency in the absolute amount of $Al_2O_3$, generating arcs during welding operation, coupled with extremely low slag detachability.

Example 28: Generation of a large amount of harmful fluoride gases due to an excessive $CaF_2$ content.

Example 29: Insufficient electric conductivity of slag due to a low $CaF_2$ content, generating arcs during welding operation.

Example 30: Deteriorated covering property of slag due to absence of CaO, failing to ensure smooth bead surfaces.

Example 31: Flux fused non-uniformly due to an excessive CaO content, causing meanders to the bead.

What is claimed is:

1. A flux for overlay welding comprising in weight percent: 30–70% of $CaF_2$, 10–30% of $Al_2O_3$, 1–15% of CaO, 5–25% of $SiO_2$, and 5–25% of MgO, wherein the total amount of $CaF_2$, $Al_2O_3$, CaO, $SiO_2$ and MgO is greater than 70%, and wherein the ratio of $MgO/(Al_2O_3+SiO_2) \geq 0.20$.

2. A flux as claimed in claim 1, wherein the ratio of $MgO/SiO_2 \leq 2.0$.

3. A flux as claimed in claim 1, wherein the ratio of $MgO/Al_2O_3 \leq 2.0$.

* * * * *